Nov. 10, 1953   A. L. MATSCHKE, JR   2,658,967
VEHICLE WARNING DEVICE
Filed April 23, 1949   3 Sheets-Sheet 1
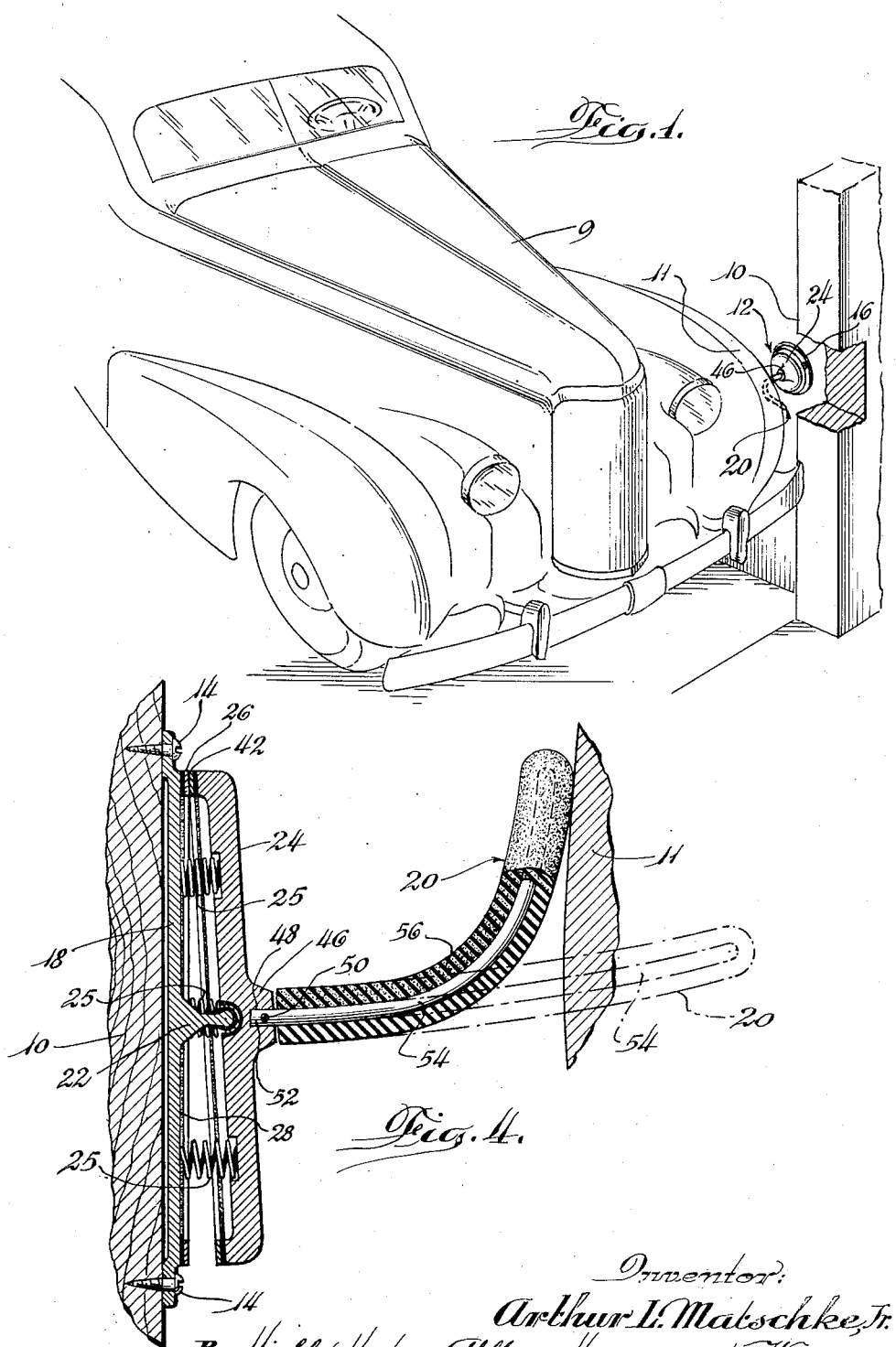

Nov. 10, 1953   A. L. MATSCHKE, JR   2,658,967
VEHICLE WARNING DEVICE
Filed April 23, 1949   3 Sheets-Sheet 2
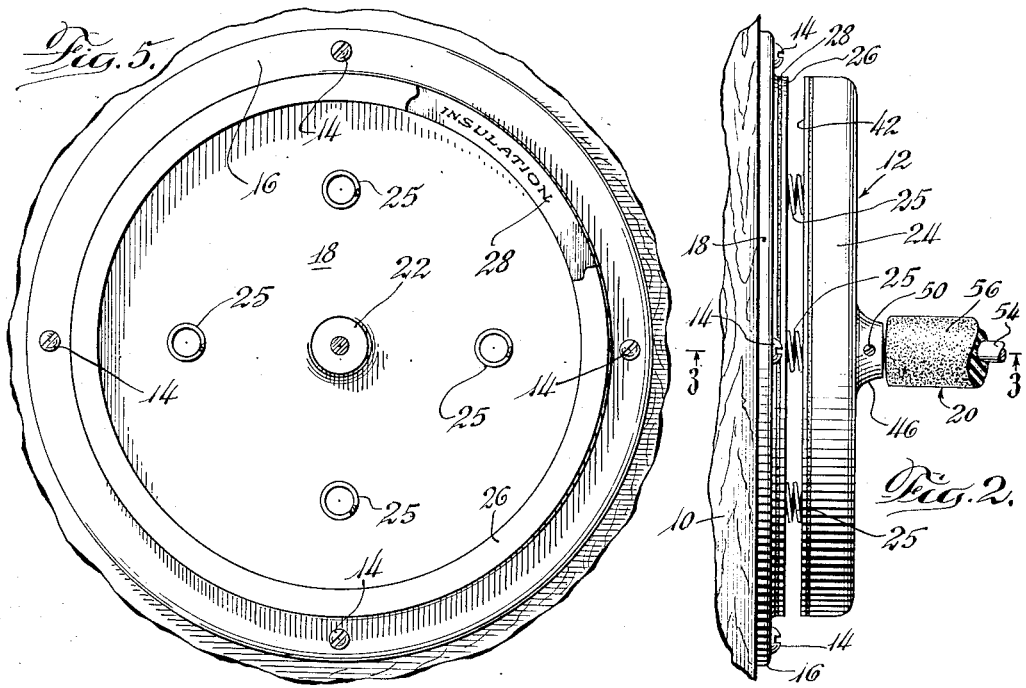
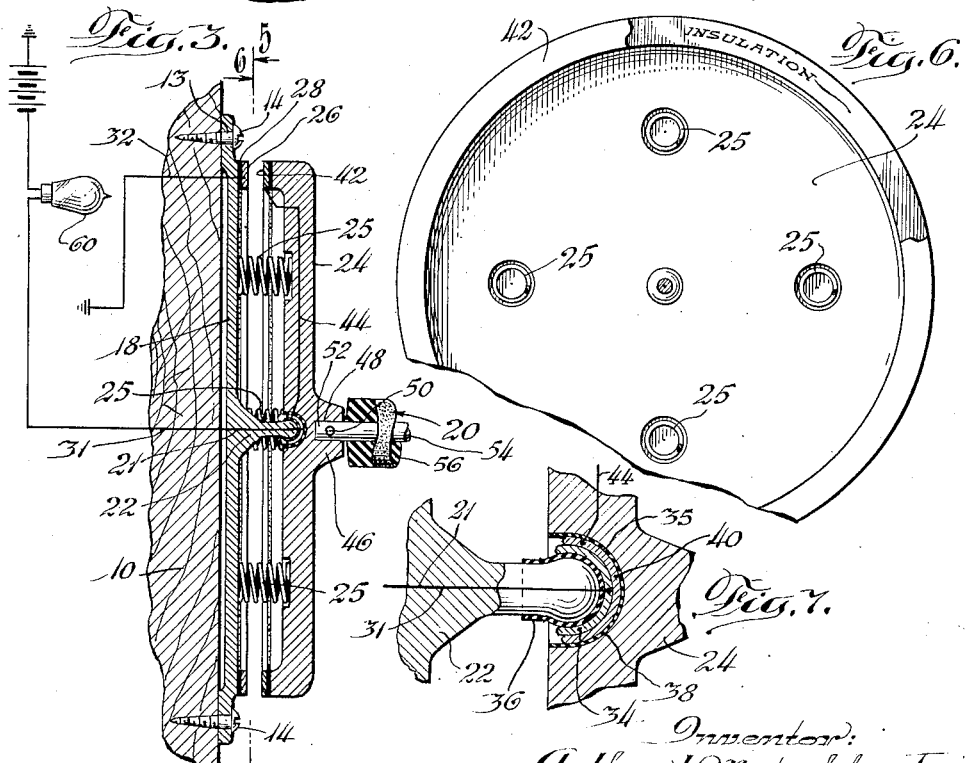

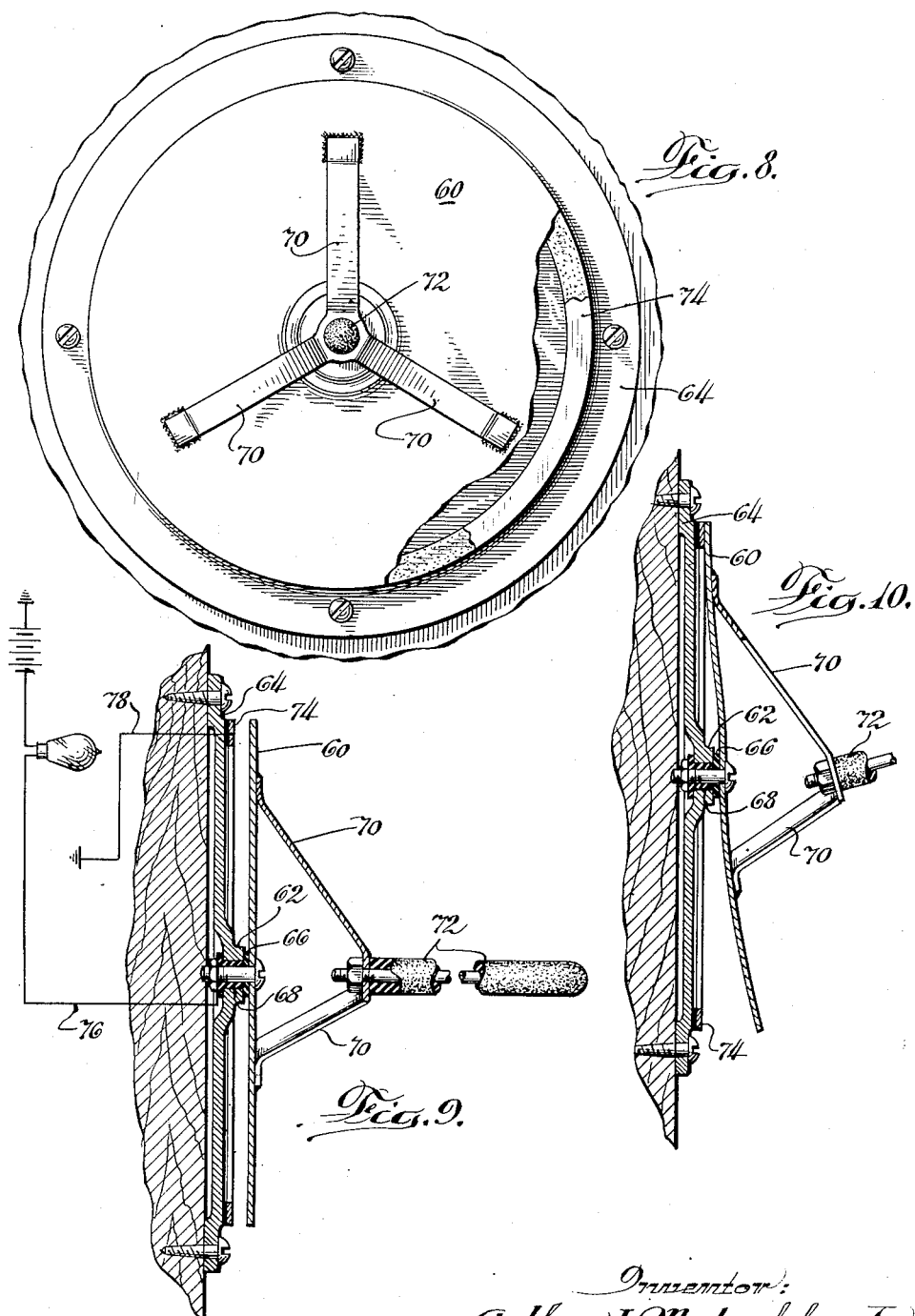

Patented Nov. 10, 1953

2,658,967

UNITED STATES PATENT OFFICE 2,658,967

VEHICLE WARNING DEVICE

Arthur L. Matschke, Jr., Chicago, Ill.

Application April 23, 1949, Serial No. 89,317

8 Claims. (Cl. 200—61.41)

My invention relates to an electrical warning device and more particularly to a vehicle warning device to be used in connection with garage doorways.

An object of my invention is to provide a new and improved warning device operable upon contact to actuate a visual or audible signal, which device may be used in garage doorways or the like to give warning of the fact that a vehicle is being driven too close to the doorway. It may be readily appreciated that the need and usefulness of my novel device is directly associated with the modern trend in motor vehicle design of substantially greater width and wherein the side and door panels extend to and beyond the fender line, thereby rendering such motor vehicles more difficult to park in garages having a doorway opening dimensioned to no more than adequately accommodate the motor vehicles of earlier design.

Another object of the invention is to provide a new and improved switching device to be closed by any part of a vehicle coming in contact therewith and wherein the actuating part of said switch is sufficiently flexible to yield under continued contact after the switch has been closed.

Other objects and advantages of my invention reside in the detail construction of the guide, which is designed for simplicity, economy, and efficiency as will be clearly brought out in the drawings and the description to follow.

In the drawings:

Fig. 1 is a perspective view illustrating my invention mounted for operation on the side member of a garage doorway;

Fig. 2 is a side elevational view of a switch which forms part of my improved warning device;

Fig. 3 is a vertical section of the switch taken on line 3—3 of Fig. 2, including a wiring diagram of the electrical signal circuit associated therewith;

Fig. 4 is a sectional view similar to Fig. 3 but showing the switch closed and the actuating arm in contact with part of a motor vehicle;

Fig. 5 is a sectional view of the switch taken along the line 5—5 of Fig. 3 to show better the base construction;

Fig. 6 is a sectional view taken in the direction of the arrows 6—6 on Fig. 3 to show better the contact plate construction;

Fig. 7 is a detailed sectional view on an enlarged scale of the pivot stub and socket;

Fig. 8 is a front elevation of a modified form of my invention;

Fig. 9 is a vertical section of the modified structure shown in Fig. 8, including a wiring diagram; and Fig. 10 is a vertical section similar to that of Fig. 9 but showing the switch closed.

Referring to the drawings, in Fig. 1 a fragment of a garage doorway is illustrated including a portion of the door frame or side member 10 to which a vehicle guide, indicated as a whole by the member 12, is attached at a suitable height above the floor. Preferably, the location of the guide is determined by and should correspond to the height above the ground of the motor vehicle at its widest point, whether it be the bumper, fender or other part of the vehicle.

Referring to Figs. 2 and 3, the warning device consists essentially of a switching mechanism including a fixed base plate 18 and a movable plate 24 secured to the base 18 and a flexible actuating member 20 which projects outwardly from the movable plate and is detachably secured thereto.

The base 18 is essentially a circular plate of metal, plastic or other suitable material having a peripheral flange 16, including screw holes 13 and an axially projecting stub 22 which may be formed as an integral part thereof and extends outwardly from the center of the plate. Superimposed at the periphery of the base plate 18 is an annular contact ring 26 of copper or the like insulated from the base 18 by an interposed ring 28 of bakelite, fiber or other electrical insulating material.

As shown in detail in Fig. 7, the pivot stub 22 has a spherically formed tip fitted with a copper conducting shell 34 which is insulated from the pivot stub by an underlying separating shell 36 of suitable insulating material.

The movable plate 24 like the base plate is essentially a circular metal plate having its back side dished and provided with a centrally located socket 38 to receive the spherical tip or ball of the pivot stub 22. The socket 38 is provided with a copper conducting cup 40 insulated from the body of the movable plate by an underlying separating cup 35 of suitable insulating material. The movable plate 24 is further provided with a peripheral annular contact ring 42 of copper or the like insulated from the movable plate and connected to the pivot socket conducting cup 40 by a conducting wire 44. On its outer side the movable plate 24 is formed with a centrally located nipple 46 apertured as indicated at 48.

The actuating finger 20 comprises a flexible spring steel rod 54 encased in sponge rubber or other material 56 to insure that the part will not mar the finish of any part of the motor vehicle. A projecting end 52 on the steel rod 54 is adapted to be received in the aperture 48 for supporting the actuating finger from the movable plate and the parts are detachably secured together by means of a set screw 50 passing through the nipple 46 and into an aperture in the end 52 of the rod.

While the pivot stub 22 with its spherical head forms an axis upon which the movable plate 24 is rockable in a plurality of planes, this plate is held on the stub normally in parallel spaced relation to the base plate 18 by means of a plurality of compression springs 25. Preferably four equidistantly spaced springs are used for this purpose. These springs 25 are welded or otherwise permanently secured at opposite ends to the confronting sides of the base and the movable plate to effect permanent holding of the movable plate 24 on the pivot stub 22 of the base 18. Thus assembled, the guide comprises an electrical circuit closing device having a movable contact which may be rocked in any direction against the return action of the four coil springs to close an electrical circuit by the contact of the annular contact ring 42 on the movable plate 24 with the annular contact ring 26 on the base. This is clearly shown in Fig. 4 which illustrates the guide being actuated to cause contact between the contact rings of the base and movable plate.

With further reference to Fig. 3, it is seen that the closed electrical signal circuit is accomplished as follows. The lead wire 31 on one side of the circuit passes through a hole 21 in the stub 22 and is connected to the conducting shell 34. The conducting shell 34 at the tip of the stub is received by and is in constant electrical contact with conducting cup 40 of the socket 38 of the movable plate 24. The conducting cup 40 is in electrical contact with the peripheral annular contacting ring 42 of the movable plate 24 by reason of a connecting conductor 44. The other side of the electric signal circuit is connected to the peripheral annular contact ring 26 of the base 18 by the lead wire 32, the circuit being completed by contact between the annular contact ring 26 of the base 18 and the annular contact ring 42 of the movable plate 24 as shown in Fig. 4.

In installing the warning device of the present invention, the guide 12 is securely fastened to the door frame or side member 10 of a garage doorway by the screws 14 passing through a flange 16 on a base 18. As illustrated in Fig. 1, part of the guide projects horizontally into the doorway opening a distance determined by the length of the actuating finger 20, preferably eight to twelve inches. However, the length of the actuating finger may be greater or less depending upon special conditions of installation and upon the desired amount of clearance to be maintained. As will be more clearly brought out, installation of my invention contemplates the use of two such guides, the second guide being similarly attached to the opposite side member of the doorway opening such that the two guides oppose each other and act to limit the zone of clearance of the doorway opening. These guides, which are essentially switching devices, may then be placed in circuit with any one of a variety of known electrical signaling means. Preferably, visual signal means should be used; such means consisting of two differently colored lights, for example, red and green, located on the end wall of the garage at a point within the line of vision of a person driving in or out of his garage, each of said colored lights being in circuit with one of the two guides and independent of each other.

Thus installed, the invention provides a vehicle warning device embodying an electrical switch having an actuating finger projecting outwardly from the side member of a garage doorway opening to be actuated by contact with any part of a motor vehicle in being driven into or out of the garage, thereby to produce a warning signal, either audible or visual, to the driver so as to inform him that he is within danger of contact between a fender or side of his vehicle and one or the other side members of the garage doorway opening that he may further maneuver his vehicle in or out of the garage without danger of scratching or denting any part of the painted surface of his vehicle.

The manner in which the invention operates is clearly illustrated in Figs. 1 and 4 wherein a part 11 of the vehicle 9 is in contact with the actuating finger 20 and the movable plate 24 is initially rocked out of parallelism with respect to the base against the action of the coil springs 25 until the annular contact rings 26 and 42 are in contact at one point. It is an important feature of the invention that further contact between the guide and any part of a motor vehicle will be taken up by the unlimited flexibility of the actuating arm 20 which is preferably designed to have a resistance to distortion only slightly greater than that of the combined expansion and contraction resistance of the compression springs 25. When the circuit is thus closed, a signal light 60 will be energized immediately to inform the driver that he is too close to one side or the other of the door opening, depending upon which of the two signal lights is on. The driver may then further maneuver his vehicle until the light goes off, indicating that he is no longer in contact with the guide and out of danger of contact with either side members of the doorway opening.

Figs. 8, 9 and 10 of the drawing show various views of a modification in the switching mechanism of the invention wherein a flexible contacting plate 61 has been substituted for the movable plate 24 and the coil springs 25 of the first described structure. While the operation and function of the modified switching device is substantially identical to that of the first described structure, it is anticipated that the substitution of a flexible metal contacting plate provides a simplified switching means which may be manufactured at a lower cost and which means is particularly adaptable to the warning device described herein.

With further reference to Figs. 8, 9 and 10, the contacting plate 61 is a circular flexible plate of conducting metal centrally held on the axially projecting boss 62 extending outwardly from the center of a base plate 64 by a screw or bolt 65 and insulated from the base plate 64 by an interposed insulating washer 66 and a flanged sleeve 68. It should be recognized that the base plate 64 serves substantially the same purpose as the base plate 18 shown in Figs. 3 and 5 and already described.

Welded or otherwise centrally secured to the upper surface of the contacting plate 61 is a tripod bracket 70 for supporting the actuating finger 72 and for imparting deflection to the flexible plate 61 when the finger 72 is actuated by vehicle contact.

The manner in which this modified switching means operates to close the signal circuit of the invention is clearly illustrated in Fig. 10. Initial vehicle contact with the actuating finger 72 deflects the same to distort and depress the flexible contacting plate 61 into contact with an annular contact ring 74 on the base plate 64, thereby completing the electric signal circuit shown in Fig. 9 which includes a lead wire 76 connected at one end to the bolt 65 which is electrically connected to the flexible contact plate 61. When this plate is distorted it makes contact with the annular contact 74 fixed to the base plate 64. This contact may be grounded through a conductor 78. As its end opposite that connected to the bolt 65 the lead wire 76 is connected to one pole of a lamp socket 80, the other pole of which is connected to one pole of a battery 82 having a second pole that is grounded. Lamp socket 80 may be located at any place which will be clearly visible to a vehicle driver and is provided with a suitable signal lamp 84.

While a specific embodiment of my invention has been described and illustrated herein, it should be understood that the same may be varied, within the scope of the appended claims, without departing from the spirit of the invention.

I claim:

1. A switch comprising a base adapted to be fixedly secured to suitable supporting structure, a first contact fixedly carried by said base in insulated relation thereto including an annular contact surface, a flexible body member including an annular portion to provide a second contact corresponding to said fixed contact, means to support said flexible body member from said base with said second contact normally maintained in coaxial spaced relation to said first contact and insulated therefrom, said body member being sufficiently flexible so that parts thereof may be distorted to bring the second contact into engagement with said first contact thereby to close a circuit through said switch, an actuator, and means forming a connection between said actuator and flexible body member for effecting distortion of the latter carrying the annular contact portion thereof into engagement with said first contact in response to the application of a lateral force to said actuator, wherein the means forming a connection between the actuator and the flexible body member comprises a tripod mount connected at its apex to said actuator and at the foot of the legs thereof to the flexible body member adjacent its periphery.

2. A switch comprising a base adapted to be fixedly secured to suitable supporting structure, a first contact fixedly carried by said base in insulated relation thereto including an annular contact surface, a movable body member, an annular portion secured to said body member to provide a second contact corresponding to said fixed contact, means to support said movable body member from said base with said second contact normally maintained in coaxial spaced relation to said first contact and insulated therefrom, said means including a central support located substantially coaxial with said contacts and a resilient means disposed substantially intermediate said support means and said second contact, said resilient means being yieldable to bring said second contact into engagement with said first contact thereby to close a circuit through said switch, means to electrically connect said second contact with said base, an actuator, and means forming a connection between said actuator and movable body member for effecting movement of the latter carrying the annular contact portion into engagement with said first contact in response to the application of a lateral force to said actuator, wherein the means forming a connection between the actuator and the movable body member comprises a mount connecting said actuator to the movable body member in axial alignment with said contacts.

3. A switch as claimed in claim 2, wherein said actuator is of a flexible material, the resistance of said flexible actuator to deflection being greater than the resistance of said resilient means so that said contacts will be closed before said actuator appreciably yields.

4. A switch comprising a base adapted to be fixedly secured to suitable supporting structure, a first contact fixedly carried by said base in insulated relation thereto including an annular contact surface, a flexible body member including an annular portion to provide a second contact corresponding to said fixed contact, means to support said flexible body member from said base with said second contact normally maintained in coaxial spaced relation to said first contact and insulated therefrom, said body member being sufficiently flexible so that parts thereof may be distorted to bring the second contact into engagement with said first contact thereby to close a circuit through said switch, an actuator, and means forming a connection between said actuator and flexible body member for effecting distortion of the latter carrying the annular contact portion thereof into engagement with said first contact in response to the application of a lateral force to said actuator, wherein the means forming a connection between the actuator and the flexible body member comprises a mount connecting said actuator to the flexible body member in axial alignment with said contacts and means for fastening said mount to said flexible body member at points spaced from the axis of said contacts.

5. A switch comprising a base adapted to be fixedly secured to suitable supporting structure, a first contact fixedly carried by said base in insulated relation thereto including an annular contact surface, a flexible body member including an annular portion to provide a second contact corresponding to said fixed contact, means to support said flexible body member from said base with said second contact normally maintained in coaxial spaced relation to said first contact and insulated therefrom, said body member being sufficiently flexible so that parts thereof may be distorted to bring the second contact into engagement with said first contact thereby to close a circuit through said switch, an actuator, and means forming a connection between said actuator and flexible body member for effecting distortion of the latter carrying the annular contact portion thereof into engagement with said first contact in response to the application of a lateral force to said actuator, wherein the means forming a connection between the actuator and the flexible body member comprises a mount connecting said actuator to the flexible body member in axial alignment with said contacts and means for fastening said mount to said flexible body member at points spaced from the axis of said contacts, wherein said flexible body member includes a flexible portion disposed between said spaced points and across the axis of said contacts.

6. A switch comprising a base adapted to be fixedly secured to suitable supporting structure, a first contact fixedly carried by said base in insulated relation thereto including an annular contact surface, a flexible body member including an annular portion to provide a second contact corresponding to said fixed contact, means including a rigid connection between said base and flexible body member substantially coaxial with said contacts to support said flexible body member from said base with said second contact normally maintained in coaxial spaced relation to said first contact and insulated therefrom, said body member being sufficiently flexible so that parts thereof may be distorted to bring the second contact into engagement with said first contact thereby to close a circuit through said switch, an actuator, and means forming a connection between said actuator and flexible body member for effecting distortion of the latter carrying the annular contact portion thereof into engagement with said first contact in response to the application of a lateral force to said actuator, wherein the means forming a connection between the actuator and the flexible body member comprises a mount connecting said actuator to the flexible body member in axial alignment with said contacts and means for fastening said mount to said flexible body member at points spaced from the axis of said contacts.

7. A switch as claimed in claim 2, wherein said resilient means includes a plurality of springs mounted between said base and movable body member, said springs normally maintaining said contacts in parallel spaced relationship with each other.

8. A switch as claimed in claim 2, wherein said support means includes a ball and socket.

ARTHUR L. MATSCHKE, Jr.

References Cited in the file of this patent

UNITED STATES PATENTS

| Number | Name | Date |
|---|---|---|
| 497,144 | Teal | May 9, 1893 |
| 1,266,420 | Dean | May 14, 1918 |
| 1,269,400 | Dean | June 11, 1918 |
| 1,636,245 | Robins | July 19, 1927 |
| 1,695,712 | Johnson | Dec. 18, 1928 |
| 1,701,800 | Taylor | Feb. 12, 1929 |
| 1,830,298 | Tartaglia | Nov. 3, 1931 |
| 1,876,165 | Punke | Sept. 6, 1932 |
| 1,936,828 | Clement | Nov. 28, 1933 |
| 2,163,122 | Hooker | June 20, 1939 |
| 2,259,614 | Chang | Oct. 21, 1941 |
| 2,454,896 | Traub | Nov. 30, 1948 |
| 2,508,149 | Eliassen | May 16, 1950 |

FOREIGN PATENTS

| Number | Country | Date |
|---|---|---|
| 682,123 | France | Feb. 10, 1930 |